Patented Sept. 18, 1951

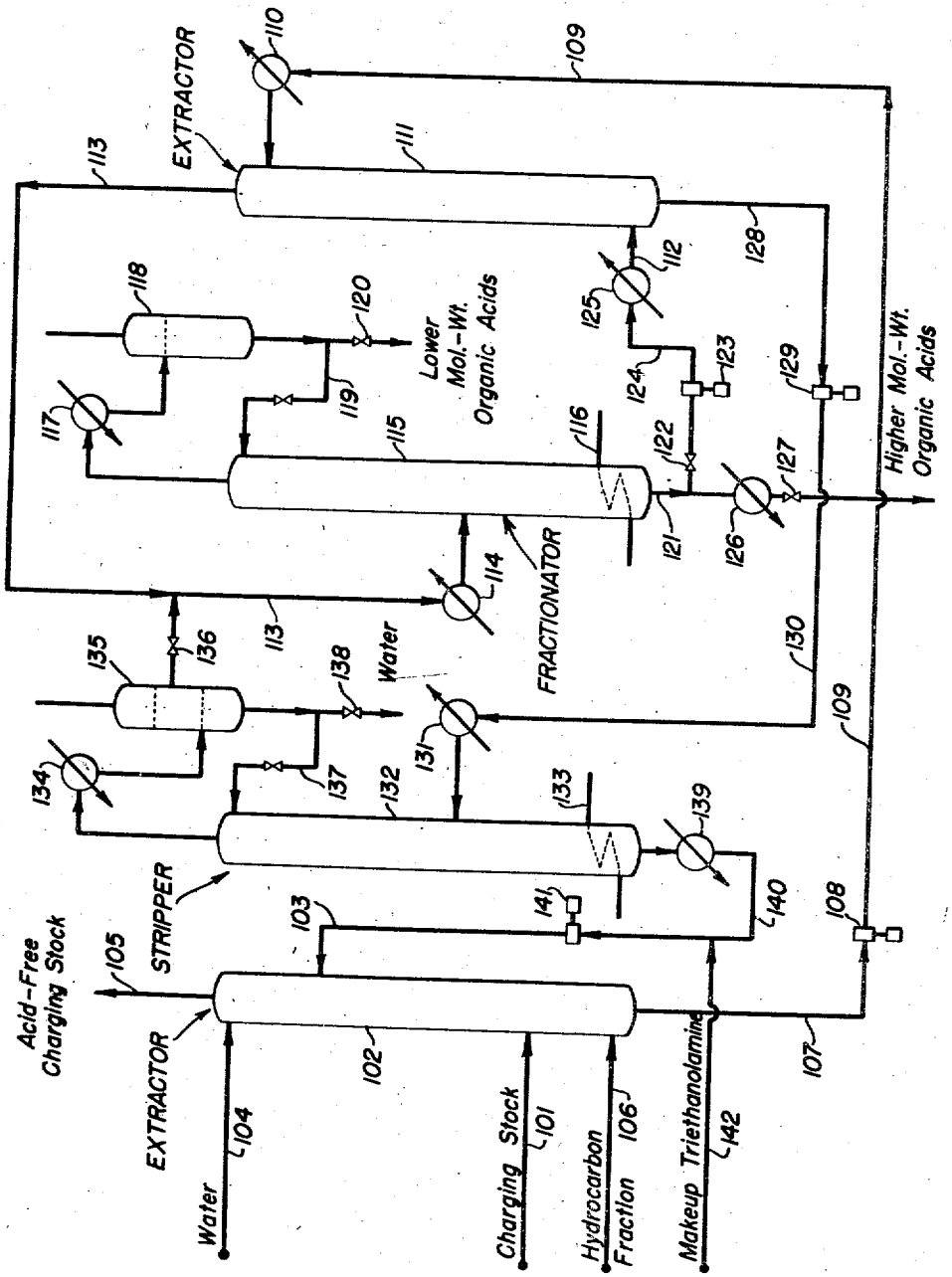

2,568,095

UNITED STATES PATENT OFFICE 2,568,095

RECOVERY OF ORGANIC ACIDS WITH AN AMINE SOLVENT

Everet F. Smith, Chicago, and Vanderveer Voorhees, Homewood, Ill., assignors to Standard Oil Company, Chicago, Ill., a corporation of Indiana Application April 29, 1949, Serial No. 90,283

10 Claims. (Cl. 260—450)

This invention relates to the recovery of organic acids. More particularly, it relates to the separation of organic acids from water-immiscible mixtures thereof with non-acidic organic substances.

Mixtures of organic acids with various other organic materials are widely encountered in the various branches of the chemical process industries, and their separation is in many cases a difficult problem. For example, crude petroleum and various petroleum fractions contain small proportions of organic acids, which must be removed in order to avoid corrosion difficulties in the storage and utilization thereof. The air-oxidation of petroleum fractions by various processes yields liquid products that are rich in organic acids and aldehydes. In the hydrogenation of carbon monoxide according to the Fischer-Tropsch process and its various modifications, particularly when the hydrogenation is carried out in the presence of an alkali-promoted iron catalyst, the resulting liquid hydrocarbon product ordinarily contains a substantial proportion of organic acids, the recovery of which is complicated by the concurrent presence of a wide variety of other organic oxygenated compounds. The separation of acids from any of these mixtures is conventionally carried out by extraction with an aqueous solution of an alkaline material, such as sodium or potassium hydroxide; and thereafter the acids are liberated from the aqueous extract by treatment with a strong acid, such as sulfuric acid. This process is open to the economic objection that it wastes a mole of inorganic base and a mole of inorganic acid for each mole of organic acid recovered. Moreover, the use of such materials leads to severe corrosion problems in actual practice. To avoid these difficulties, it has heretofore been proposed to effect the extraction of organic acids from organic mixtures with an aqueous solution of an organic base, suitably a water-soluble amine, and thereafter to recover the organic acids from the aqueous extract by steam distillation, by treatment with carbon dioxide, or the like. This improvement, however, is also uneconomical in the use of large quantities of steam; and the recovery of the amine and the carbon dioxide from the resulting amine carbonate solution leads to additional process difficulties.

We have now discovered that normally water-immiscible organic acids may be stratified from an aqueous amine solution thereof by heat treatment, optionally with water dilution. We have further discovered that such normally water-immiscible organic acids are effective solvents at elevated temperatures for extracting the water-soluble lower organic acids from aqueous amine solutions. On the basis of these discoveries, we have devised a new process for the recovery of organic acids from organic solutions thereof which may include the following steps:

1. Extraction of the charging stock with an aqueous solution of a water-miscible amine.
2. Back-washing of the resulting extract with a liquid hydrocarbon to remove therefrom any organic oxygenated compounds other than organic acids.
3. Countercurrent extraction of the resulting purified aqueous extract at elevated temperature with a water-immiscible organic acid, with or without water dilution, whereby the greater portion of the acids are liberated from the amine and are selectively extracted by the water-immiscible organic acid.
4. Fractionation of the resulting organic extract to separate the lower-boiling organic acids, which are withdrawn, and a higher-boiling organic acid fraction, which may be used in part as the "water-immiscible organic acid" required for step 3.
5. Stripping of residual organic acids from the depleted amine solution obtained in step 3, and recycling of the regenerated amine solution.

One object of our invention is to recover organic acids from water-immiscible mixtures thereof with other organic compounds. Another object is to separate organic acids in purified condition from immiscible mixtures thereof with other organic compounds. A further object is to separate organic acids from other types of organic oxygenated compounds. A still further object is to reduce the consumption of chemicals in the recovery of organic acids. A subsidiary object is to separate organic acids into fractions of higher and lower molecular weight. An additional object is to isolate individual organic acids in substantially purified conditions, free from other organic acids, other organic compounds, and other impurities. Other objects will be apparent from the description and the claims.

Suitable amines for use in the extractant solution of step 1 of our process, as defined above, are the broad class of water-immiscible, substantially non-volatile amines, including (hydroxyalkyl) amines, such as monoethanolamine, diethanolamine, triethanolamine, 2-amino-1-propanol, 3-amino-1-propanol, 1-amino-2-propanol, 2-amino-2-methyl-1-propanol, 2-amino-2-methyl-1,3-propanediol, and the like, and the alkanepolyamines, such as ethylenediamine, 1,2-propanediamine, N-substituted derivatives thereof, and the like. Of this broad class, we prefer to use secondary or tertiary amines, since they have less of a tendency to undergo side reactions during the course of subsequent operations at elevated temperatures, with the consequent production of amides, oxazolines, and other undesired by-products. For all of these reasons, triethanolamine is the preferred active constituent of our extractant solution.

The concentration of amine in the extractant solution may range between wide limits, suitably between around 2 and 40 percent by weight or higher, but is preferably between about 5 and 25 percent; and a 10 percent solution has the advantage of extracting the organic acids in an efficient manner without simultaneously extracting objectionable quantities of other organic oxygenated compounds. Below about 5 percent by weight, emulsion difficulties are encountered, the extraction efficiency of the solution is impaired, and an excessive quantity of extractant solution is required for a given extraction. Above about 25 percent by weight, the extractant solution tends to become excessively viscous, and the subsequent separation of dissolved acids from the extract becomes increasingly difficult. Extractant solutions having higher proportions of the water-miscible amine are operative, nevertheless, in the extraction operation of step 1; and when employed, the resulting extract may thereafter conveniently be diluted with water to a suitable concentration, either prior to or during the heat-treating step, in order to facilitate the recovery of organic acids therefrom.

The extraction operation of step 1 is preferably carried out at ordinary or somewhat reduced temperatures, in order to diminish the tendency toward emulsion formation, and in order to effect the maximum extraction of acids per unit volume of extractant solution. It will be apparent, however, that the extraction temperature must be sufficiently high to avoid any substantial gelling of the liquid phases. It will be further apparent hereinafter that the extraction efficiency is greatly impaired at substantially elevated temperatures, for example above about 60° C., owing to the fact that the organic acids are readily released from the extract at elevated temperatures above about 75° C. For these reasons, we ordinarily choose to operate at a temperature within the range of about 10 to 60° C., and preferably between about 20 and 40° C.

Ordinary pressures may satisfactorily be employed in step 1. Where, for any reason, ebullition may tend to occur within the extraction zone, elevated pressure should preferably be employed, sufficient to repress such ebullition, in order to prevent disturbance of the liquid phases therein, which would tend ordinarily to destroy the extraction efficiency.

The volume of extractant solution employed should contain a quantity of amine at least sufficient to react stoichiometrically with all of the organic acids in the charging stock. We prefer to employ a substantial excess of the amine, for example up to around twice the theoretical quantity, in order to insure substantially complete removal of the organic acids from the charging stock.

Where our charging stock contains organic oxygenated compounds other than organic acids, the resulting aqueous extract tends to be contaminated therewith. Such contamination may be greatly reduced or entirely avoided by step 2 of our process, as outlined above, wherein the extract is back-washed with a liquid hydrocarbon, preferably at a temperature within the range disclosed above as suitable for step 1, and optimally at the same temperature as that employed in step 1. Since the organic acids are chemically bound to the amine in the extract, whereas the contaminants are not, the contaminants are readily removed by the hydrocarbon, leaving the extract in purified condition. The back-washing operation may be carried out with substantially any hydrocarbon that is liquid under the process conditions. A suitable hydrocarbon fraction may be isolated, for example, from the charging stock itself, where the charging stock is of the hydrocarbon type. We prefer to use a comparatively narrow hydrocarbon fraction, boiling at least about 10° C. away from the boiling point of the major constituent of the acid fraction. Such a hydrocarbon fraction, when dissolved in small quantities by the aqueous extract and carried therewith into subsequent processing steps, may readily be separated from the desired organic acids by fractional distillation.

In step 3 of our process, the aqueous amine-plus-acid extract from step 2 is countercurrently contacted at an elevated temperature with an organic acid that is insoluble therein under the temperature conditions employed. For this purpose, a normally water-immiscible organic acid is suitable, or a higher-boiling organic acid fraction, obtained for example in a later step of our process by fractional distillation of the recovered organic acids. In this connection, the term "water-immiscible" is to be understood as meaning "not totally miscible with water in all proportions." The temperature employed in step 3 should ordinarily be sufficiently high to induce liberation of the normally water-immiscible organic acids from their amine salts, so that such liberated acids stratify and dissolve in the countercurrent extractant solution. At the same time, the countercurrent extractant solution removes from the aqueous extract the lower-boiling organic acids contained therein which do not tend to stratify under the conditions employed. In this way, before the aqueous amine solution leaves the extraction zone, it is contacted last with a higher-boiling organic acid relatively insoluble therein, so that the emerging amine solution is comparatively free from organic acids, and may be reutilized in step 1. The acid stream leaving the countercurrent extraction zone comprises, under properly chosen conditions of temperature and relative space velocities, substantially all of the organic acids entering the zone.

The temperature required to produce liberation and stratification of the organic acids from the aqueous extract in step 3 depends largely upon the amine employed, the concentration thereof in the aqueous extract, and the types of organic acids present therein. The temperature varies directly as a function of the amine concentration and inversely as a function of the molecular weight of the acids. For example, a mixture of organic acids ranging from about $C_1$ to $C_{20}$ and having an average molecular weight of 145 was found to stratify from an aqueous 20 percent by weight triethanolamine solution at 90° C., whereas it did not stratify from an aqueous 50 percent by weight triethanolamine solution even at 98° C. In general, stratification may be induced at temperatures from about 75° C. upward for amine solutions within our preferred range of about 5 to 25 percent by weight, and may be initiated or encouraged by diluting the aqueous extract with water, before, during, or after the application of heat thereto. Somewhat lower temperatures may be suitable where the proportion of lower-boiling organic acids in the total acid mixture is lower.

It will be apparent that step 3, as set forth above, is a specialized adaptation of the effects on which our invention is based, namely, the heat-stratification of normally water-immiscible organic acids from aqueous amine solutions, and the extraction of lower organic acids from aqueous amine solutions by use of normally water-immiscible organic acids at elevated temperatures. Manifestly, we may utilize these effects in a simpler manner to accomplish the objects of our invention. We may, for example, heat the purified extract from step 2 to an elevated temperature so as to liberate and stratify higher organic acids therefrom. Subsequently, after withdrawal of the stratified acids, the depleted extract may be further extracted with a higher organic acid to remove lower organic acids therefrom. In the last operation, the temperature employed need only be sufficiently high to prevent the solution of substantial quantities of the higher organic acid in the aqueous amine solution. Other modifications will be apparent to those skilled in the art.

In step 4, the acid mixture from step 3 is fractionally distilled by conventional methods to separate therefrom a higher acid fraction for recycling to step 3. Simultaneously, a lower acid fraction is obtained. It will be apparent that this fractionation may be carried out in such a way as to separate the constituent acids as substantially pure fractions.

In step 5, the depleted amine solution obtained in step 3 is stripped of residual acids by steam distillation, or by blowing with a hot, inert gas, or by similar methods, and the purified aqueous amine solution is recycled to step 1. Alternatively, the greater portion of the depleted amine solution obtained in step 3 may be recycled to step 1 while the remainder thereof is withdrawn and exhaustively stripped of acids before being recycled, in order to prevent the buildup of substantial quantities of acid therein. In the latter case, the exhaustively purified amine solution should be recycled to such a point in the extraction zone of step 1 that the charging stock is contacted with it last before emerging from the extraction zone.

Our process is suitable in general for the separation and recovery of organic acids from organic mixtures thereof, including the broad classes of carboxylic acids and phenols. We may, for example, employ our process for the purification of hydrocarbons, alcohols, ethers, and the like, by separating therefrom phenol, cresols, and the like, and/or alkanecarboxylic acids, such as acetic, propionic, butyric, isobutyric, valeric, caproic, caprylic, capric, myristic, palmitic, and stearic acids, and the like, and their olefinic and hydroxylated homologues, and/or alkanepolycarboxylic acids, such as oxalic, malic, maleic, succinic, adipic, and sebacic acids, and the like, and/or other carboxylic acids, such as benzoic acid, cyclohexanecarboxylic acid, and the like.

The attached flowsheet illustrates an advantageous embodiment of our invention:

A charging-stock mixture of hydrocarbons, aldehydes, alcohols, ketones, carboxylic acids, and phenols, such as the organic phase produced by the hydrogenation of carbon monoxide in the presence of a fluidized, alkali-promoted iron catalyst, is introduced through line 101 into a lower intermediate section of extractor 102, wherein it flows upward countercurrent to an aqueous extractant solution containing 10 percent by weight of triethanolamine, introduced into an upper intermediate section of the extractor through line 103. Extractor 102 is maintained at a temperature around 20 to 30° C. and at autogenous pressure.

A quantity of water is introduced into the top of extractor 102 through line 104 to wash out any entrained or dissolved amine from the acid-depleted charging stock, which then emerges from the top of the extractor through line 105 and is withdrawn, suitably for additional processing to recover other organic oxygenated compounds therefrom.

Through line 106 into the bottom of extractor 102 is introduced a hydrocarbon fraction to back-wash from the extract stream any organic oxygenated compounds other than organic acids. Such a hydrocarbon fraction may be simply a portion of the acid-free charging stock in line 105, after removal of organic oxygenated compounds therefrom, or it may be a narrow-boiling fraction isolated therefrom by fractional distillation. The back-wash stream flows upward through extractor 102, and after being enriched with organic oxygenated compounds from the downward-flowing aqueous extract, it blends with the charging-stock hydrocarbons and emerges overhead through line 105.

The aqueous extract stream emerging from the bottom of extractor 102 through line 107 comprises predominantly water and triethanolamine organic-acid salts. This stream is transferred by pump 108 through line 109 and heater 110 into the top of extractor 111, where it is countercurrently contacted at an elevated temperature with a stream of higher molecular weight organic acids, obtained as described below, and introduced into the bottom of extractor 111 through line 112. The temperature within extractor 111 is suitably maintained between about 75 and 200° C., and preferably between about 100 and 150° C. At these temperatures, the amine salts are highly unstable, and virtually all of the organic acids, other than the members of lowest molecular weight, such as acetic acid, tend to form a separate phase. This phase, and the loosely bound and dissolved lower molecular weight acids, are extracted by the higher molecular weight acid stream as it flows upward through extractor 111. The resulting mixture of organic acids flows out of the top of the extractor through line 113, and is led through heater 114 into an intermediate section of fractionator 115, equipped with reboiler 116. Therein, the lower molecular weight organic acids are distilled overhead through condenser 117 into reflux drum 118, from which a portion is refluxed to the top of fractionator 115 through valved line 119, and the remainder is withdrawn through valved line 120 to storage or further processing to isolate the individual constituents thereof. A higher molecular weight organic-acid fraction, containing propionic acid and higher homologues, flows out of the bottom of fractionator 115 through line 121, and is divided into two streams. One stream flows through valved line 122 into pump 123, by which it is transferred through line 124, heater 125, and line 112 into the bottom of extractor 111, where it serves as a countercurrent extractant, as described above. The remainder of the stream in line 121 flows through cooler 126 and is withdrawn through valved line 127 to storage or to further processing to isolate the individual constituents.

The acid-depleted aqueous amine solution emerging from the bottom of extractor 111 through line 129 is transferred by pump 129 through line 130 and heater 131 into an intermediate section of stripper 132. Within the stripper, any organic acids remaining in the aqueous stream are distilled out by the action of reboiler 133, together with a sufficient quantity of water to adjust the concentration of the amine to the desired level for recycling. The mixture of acids and water emerge overhead through condenser 134 into separator 135, where two layers are formed. The acid layer is withdrawn through valved line 136 and commingled with the acids in line 113. The aqueous phase is refluxed in part to the top of stripper 132 through valved line 137, and is withdrawn through valved line 138.

A substantially acid-free aqueous amine solution emerges from the bottom of stripper 132 through cooler 139 and line 140, and is recycled by pump 141 through line 103 to an upper intermediate section of extractor 102. Makeup amine is supplied as needed through line 142 to line 140.

While we have described our invention with reference to a particular charging stock, a particular amine extractant solution, and a particular flow scheme, it is to be distinctly understood that we are not limited thereto. Our invention is broadly applicable to the problem of recovering organic acids, as set forth in detail herein, and is not to be construed more narrowly than the disclosure of the entire specification, including the appended claims. In general, it may be said that any modifications or equivalents that would ordinarily occur to one skilled in the art are to be considered as lying within the scope of our invention.

In accordance with the foregoing description, we claim as our invention:

1. In a process for separating a water-immiscible organic acid from a water-immiscible organic solution comprised thereof, the steps which comprise extracting said organic acid from said solution at a temperature between about 10 and 60° C. with an aqueous extractant solution containing between about 5 and 25 percent by weight of a water-immiscible amine, heating the resulting extract to an elevated temperature above about 75° C. whereat liberation and stratification of said organic acid takes place, and separating and withdrawing said organic acid.

2. The process of claim 1 wherein said water-miscible amine is selected from the group consisting of secondary and tertiary amines.

3. The process of claim 1 wherein said water-miscible amine is a (hydroxyalkyl) amine.

4. The process of claim 3 wherein said (hydroxyalkyl) amine is an ethanolamine.

5. The process of claim 4 wherein said ethanolamine is triethanolamine.

6. The process of claim 1 wherein said water-miscible amine is an alkanediamine.

7. The process of claim 6 wherein said alkanediamine is ethylenediamine.

8. In a process for separating a water-immiscible organic acid from a water-immiscible organic solution comprised thereof, the steps which comprise extracting said organic acid from said solution at a temperature between about 10 and 60° C. with an aqueous extractant solution containing between about 2 and 40 percent by weight of a water-miscible amine, adding to the resulting extract a sufficient quantity of water to reduce the amine concentration therein to not more than 25 percent by weight, heating said extract to an elevated temperature above about 75° C. whereat liberation and stratification of said organic acid takes place, and separating and withdrawing said organic acid.

9. In a process for separately recovering a water-miscible organic acid and a water-immiscible organic acid from a water-immiscible solution comprised thereof, the steps which comprise (1) extracting said organic acids from said solution at a temperature between about 10 and 60° C. with an aqueous extractant solution containing between about 5 and 25 percent by weight of a water-miscible amine; (2) countercurrently contacting the resulting aqueous extract at an elevated temperature above about 75° C. with a water-immiscible organic acid, and withdrawing an organic extract containing substantially all of the organic acids initially present in said aqueous extract; (3) fractionally distilling said organic extract and separating therefrom said water-miscible organic acid and said water-immiscible organic acid; and (4) recycling a portion of said water-immiscible organic acid to said step 2 for countercurrently contacting said aqueous extract.

10. In a process for recovering organic acids from a hydrocarbon solution thereof obtained by hydrogenating carbon monoxide in the presence of an alkali-promoted iron catalyst, said hydrocarbon solution containing water-miscible and water-immiscible organic acids, the steps which comprise (1) countercurrently contacting said hydrocarbon solution at a temperature between about 10 and 60° C. with an aqueous extractant solution containing between about 5 and 25 percent by weight of a water-immiscible amine, whereby an aqueous extract is obtained containing substantially all of the organic acids initially present in said hydrocarbon solution; (2) backwashing said aqueous extract with a liquid hydrocarbon, whereby non-acidic impurities are removed from said aqueous extract; (3) countercurrently contacting the resulting aqueous extract at an elevated temperature above about 75° C. with a water-immiscible organic-acid fraction and withdrawing an organic extract containing substantially all of the organic acids initially present in said aqueous extract; (4) fractionally distilling said organic extract and separating therefrom a water-miscible organic-acid fraction and a water-immiscible organic-acid fraction; and (5) recycling a portion of said water-immiscible organic-acid fraction to said step 3 for countercurrently contacting said aqueous extract.

EVERET F. SMITH.
VANDERVEER VOORHEES.

REFERENCES CITED

The following references are of record in the file of this patent:

UNITED STATES PATENTS

| Number | Name | Date |
|---|---|---|
| 2,279,277 | Shoemaker | Apr. 7, 1942 |
| 2,342,028 | Zellner | Feb. 15, 1944 |
| 2,430,086 | Staff | Nov. 4, 1947 |

Certificate of Correction

Patent No. 2,568,095                                        September 18, 1951

EVERET F. SMITH ET AL.

It is hereby certified that error appears in the printed specification of the above numbered patent requiring correction as follows:

Column 2, line 49, for "water-immiscible" read *water-miscible*; column 6, line 62, for "reboiled" read *reboiler*; column 7, line 55, for "water-immiscible" read *water-miscible*;

and that the said Letters Patent should be read as corrected above, so that the same may conform to the record of the case in the Patent Office.

Signed and sealed this 22nd day of January, A. D. 1952.

[SEAL]

THOMAS F. MURPHY,
*Assistant Commissioner of Patents.*